United States Patent [19]

Johnson

[11] Patent Number: 4,580,825

[45] Date of Patent: Apr. 8, 1986

[54] SAFETY RESCUE GRAPPLE

[76] Inventor: Douglas W. Johnson, 1214 Ocean View Rd., Charleston, S.C. 29412

[21] Appl. No.: 685,465

[22] Filed: Dec. 24, 1984

[51] Int. Cl.[4] .......................... A62B 37/00; B25J 1/00

[52] U.S. Cl. ....................................... 294/24; 119/152; 294/19.1; 441/80

[58] Field of Search ........................ 294/1.1, 2, 17, 15, 294/19.1, 24, 26, 66.1, 140; 4/488, 496, 504; 5/61, 81 R, 83, 84; 114/221 R, 230; 119/96, 151-153; 135/65, 66, 75; 174/5 R; 182/137, 151, 189, 230; 224/158; 272/18, 71; 441/80-85, 125, 136; D29/1, 6, 99

[56] References Cited

U.S. PATENT DOCUMENTS

| | | | |
|---|---|---|---|
| 506,864 | 10/1893 | Roberts | 119/152 |
| 705,775 | 7/1902 | Moore | 294/24 X |
| 1,208,624 | 12/1916 | Newman | 294/19.1 X |
| 1,562,034 | 11/1925 | Mieher | 294/26 |
| 3,048,139 | 8/1962 | Duckett | 294/17 X |
| 3,106,726 | 10/1963 | Dwyer | 441/80 |
| 3,330,588 | 7/1967 | Alfano | 294/1.1 X |
| 4,004,539 | 1/1977 | Wesson | 294/19.1 X |

*Primary Examiner*—Johnny D. Cherry
*Attorney, Agent, or Firm*—Shefte, Pinckney & Sawyer

[57] ABSTRACT

An apparatus for extricating an individual from a hazardous location or situation which includes a mechanism for selectively grappling various portions of the individual's body and a generally elongated frame having a substantially longitudinal extent which can be varied in length and which supports the body grappling mechanism. The elongated frame allows an individual to use the grappling mechanism to grapple a portion of the body of the individual who is in a jeopardized situation from a position of safety without jeopardizing both individuals. The body grappling mechanism includes a torso engaging mechanism and a limb engaging mechanism, both of which extend outwardly from the longitudinal axis of the frame of the apparatus. The torso engaging mechanism is contoured to define at least one torso receiving concavity having a lateral extent, with respect to the frame, which is selectively sized and configured to retainingly receive the torso of an average individual. The limb engaging mechanism is contoured to define at least one limb receiving concavity having a lateral extent, with respect to the frame, which is selectively sized and configured to retainingly receive at least one limb of an average individual. The lateral extent of the limb receiving concavity is less than the lateral extent of the torso receiving concavity. Depending upon the hazardous situation in which the apparatus is to be utilized, the entire apparatus may be formed from electrically insulating materials and/or chemically resistant materials.

31 Claims, 17 Drawing Figures

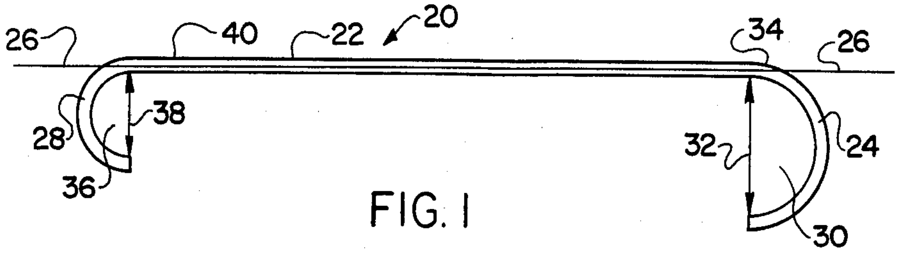
FIG. 1
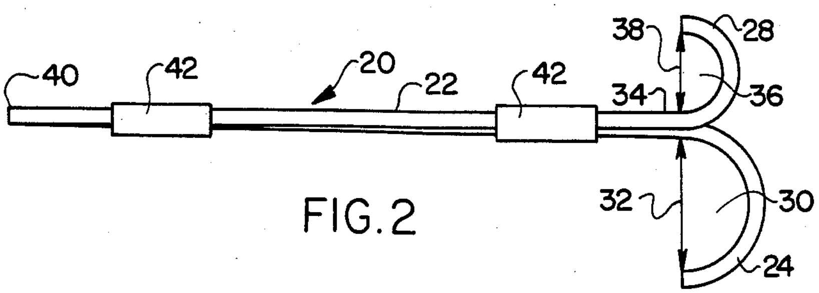
FIG. 2
FIG. 3
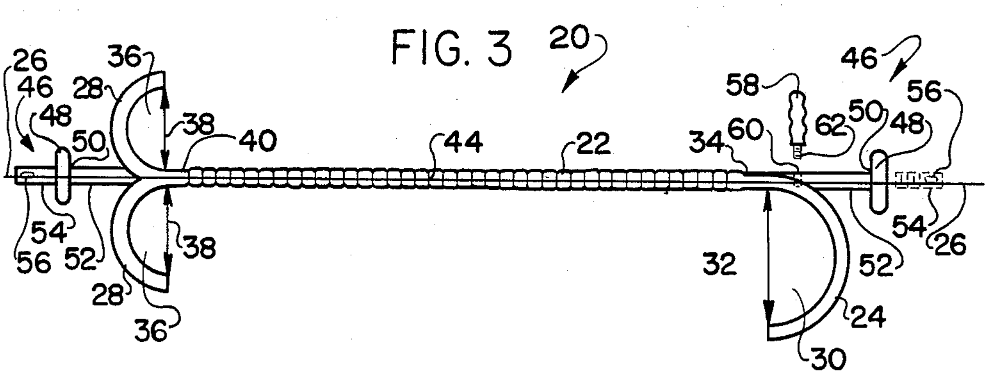
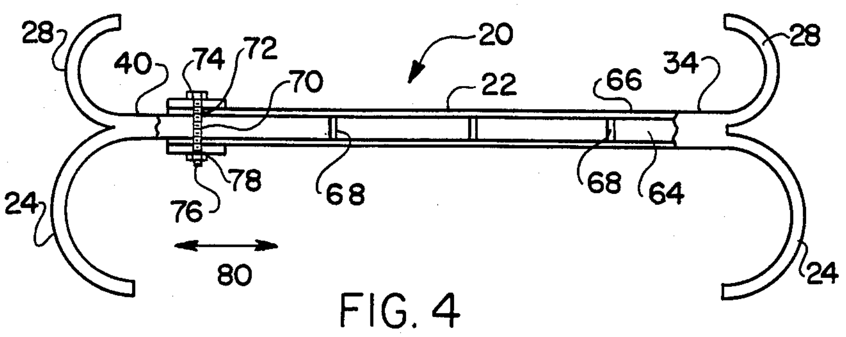
FIG. 4

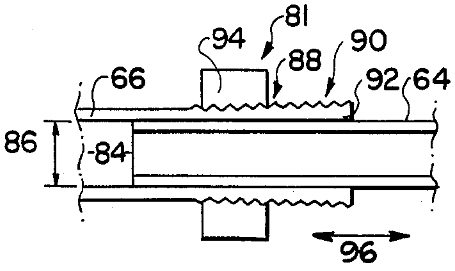
FIG. 5
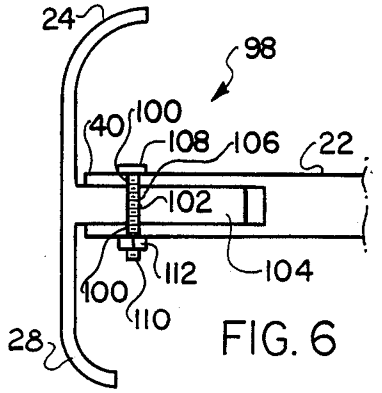
FIG. 6
FIG. 7
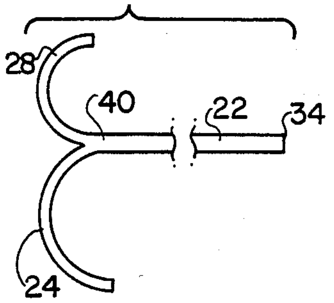
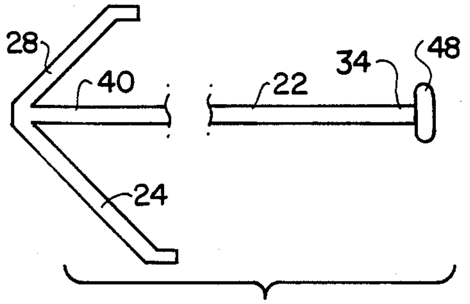
FIG. 11
FIG. 8
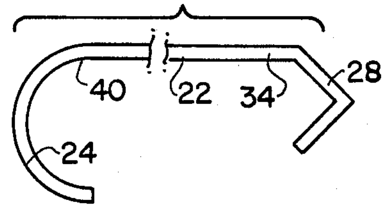
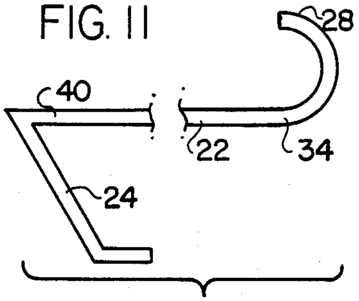
FIG. 12
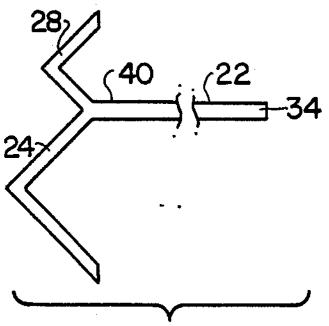
FIG. 9
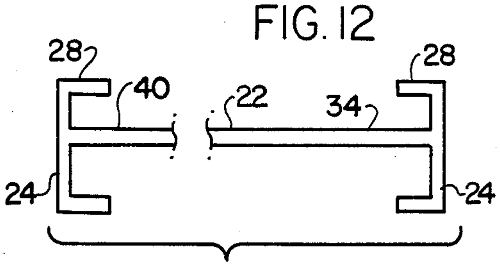
FIG. 13

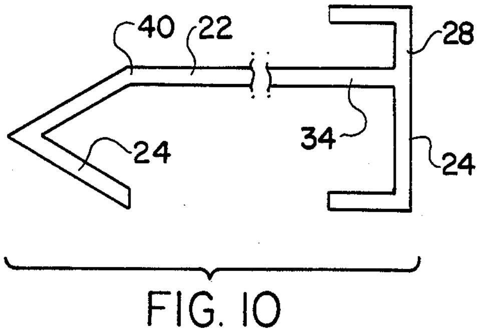
FIG. 10
FIG. 14
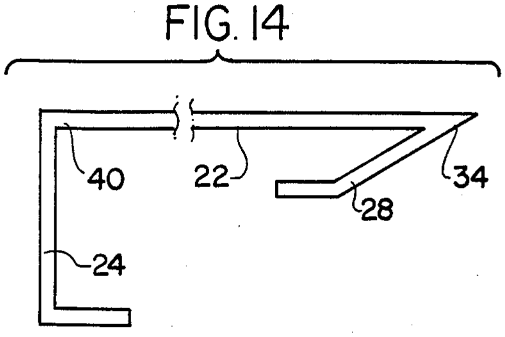
FIG. 15
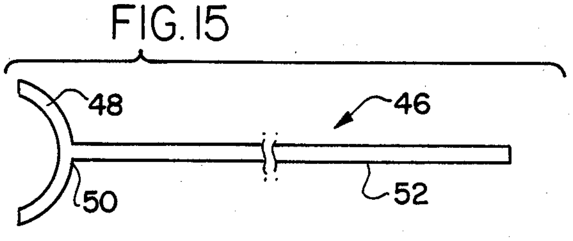
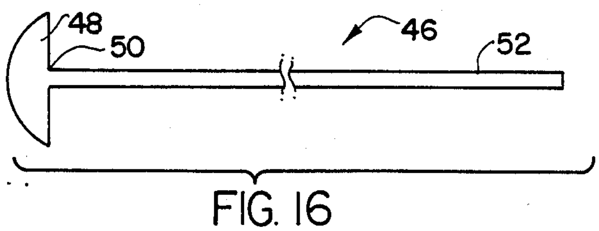
FIG. 16
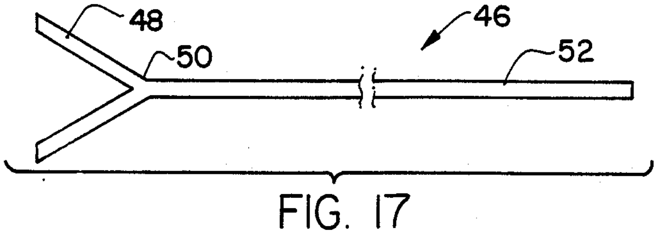
FIG. 17

SAFETY RESCUE GRAPPLE

BACKGROUND OF THE PRESENT INVENTION

The present invention relates generally to safety devices which are designed to assist a person in extricating or rescuing another individual from a hazardous or potentially hazardous situation. In particular, the rescue device should be designed so that its utilization, during the rescue attempt, will not result in the party attempting the rescue also being exposed to the hazard.

As a result of the ever increasing and expanding wealth of technical knowledge and the various and sundry areas in which this knowledge is applied, people have been thrust into numerous situations in which they could, through accident, be exposed to a hazardous agent or agents. Exemplary hazardous agents to which an individual may be exposed at almost any time, and especially during work, are electricity and caustic, poisonous or other chemical agents. The problem of protecting individuals from exposure to certain hazardous agents has long been recognized by those in the art. In this regard the work tools of those whose work environment presents a higher than average risk of being subjected to such hazardous agents have been designed to minimize such risks. For example, work tools which will, in all likelihood, be utilized around or near to a highly hazardous electrical current have been designed to electrically insulate the user from the hazardous current. A tool of this sort is disclosed in U.S. Pat. No. 2,997,529 to Fink. The Fink patent generally discloses an electrically insulating rod and a method for manufacturing the rod. It is stated that the rod may be used to construct a lineman's pole having high dielectric strength and resistance of flash-over, low moisture absorption, satisfactory heat distortion temperature and superior weathering properties.

Unfortunately, despite utilization of the best available equipment and implementation of good safety procedures accidents can and do happen. In this regard, as a result of an accident, it is not unusual for one or more individuals to be located in a hazardous situation where their rescue could expose the person attempting the rescue to the hazardous agent. For example, the exposed person may be located in an area of chemical contamination or the exposed person may have come into contact with an electrical field or electrical current from which they are unable to remove themselves. In such situations it might be highly hazardous for the person attempting the rescue to even touch the exposed individual since such contact could well also expose the rescuing individual to the hazard. Accordingly, a strong and continuing need has arisen for an apparatus which will allow the person attempting to rescue the endangered individual to effect the rescue from a position of safety while being protected from exposure to the hazard which is present.

SUMMARY OF THE INVENTION

In response to the problems which have heretofore been encountered by those who have sought to go to the aid of an individual who is in peril, the present invention provides an efficient and readily utilizable apparatus which is adapted for use in extricating an individual from a hazardous location without also placing the individual attempting the rescue in peril. The apparatus includes a body grappling mechanism and a generally elongated frame which has a substantially longitudinal extent and supports the body grappling mechanism. The body grappling mechanism includes (1) at least one torso engaging mechanism which extends outwardly from the longitudinal axis of the frame and has a contour which defines a torso receiving concavity having a lateral extent, with respect to the elongated frame, that is selectively sized and adapted to retainingly receive the torso of an average individual and (2) at least one limb engaging mechanism which extends outwardly from the longitudinal axis of the elongated frame and has a contour which defines a limb receiving concavity having a lateral extent, with respect to with the frame, that is selectively sized and adapted to retainingly receive at least one of the limbs of an average individual. The torso engaging mechanism and the limb engaging mechanism are configured so that the lateral extent of a limb receiving concavity is less than the lateral extent of a torso receiving concavity.

In the preferred embodiment of the present invention, the entire apparatus is formed from an electrically insulating material or a chemically resistant material, or material that is both electrically and chemically resistant. However, depending upon the situation in which the apparatus is likely to be utilized, only parts of the apparatus may be formed of such materials.

In one embodiment of the invention at least one torso engaging mechanism is supported at the first end of the elongated frame with each torso engaging mechanism defining a torso receiving concavity extending generally laterally to the first end of the elongated frame, and at least one limb engaging mechanism is supported at the second end of the elongated frame, and with each limb engaging mechanism defining a limb receiving concavity extending generally laterally to the second end of the elongated frame.

In another embodiment at least one torso engaging mechanism is supported at the first end of the elongated frame with each torso engaging mechanism defining a torso receiving concavity extending generally laterally to the first end of the elongated frame, and at least one limb engaging mechanism is also supported at the first end of the elongated frame with each limb engaging mechanism defining a limb receiving concavity also extending generally laterally to the first end of the elongated frame.

In yet another embodiment at least one torso engaging mechanism is supported at the first end of the elongated frame with each torso engaging mechanism defining a torso receiving concavity extending generally laterally to the first end of the elongated frame, and at least two limb engaging mechanisms are supported by the elongated frame with one limb engaging mechanism being supported at the first end of the elongated frame and defining a limb receiving concavity extending generally laterally to the first end of the elongated frame and with the second limb engaging mechanism being supported at the second end of the elongated frame and defining a limb receiving concavity extending generally laterally to the second end of the elongated frame.

In a further embodiment of the present invention at least two torso engaging mechanisms are supported by the elongated frame with one torso engaging mechanism being supported at the first end of the elongated frame and defining a torso receiving concavity extending generally laterally to the first end of the elongated frame and with a second torso engaging mechanism being supported at the second end of the elongated frame and defining a torso receiving concavity extending generally laterally to the second end of the elongated frame, and at least one limb engaging mechanism is supported at the first end of the elongated frame with each limb engaging mechanism defining a limb receiving concavity extending generally laterally to the first end of the elongated frame.

In yet a further embodiment of the present invention at least two torso engaging mechanisms are supported by the elongated frame with one torso engaging mechanism being supported at the first end of the elongated frame and defining a torso receiving concavity extending generally laterally to the first end of the elongated frame and with a second torso engaging mechanism being supported at the second end of the elongated frame and defining a torso receiving concavity extending generally laterally to the second end of the elongated frame, and at least two limb engaging mechanisms are supported by the elongated frame with one limb engaging mechanism being supported at the first end of the elongated frame and defining a limb receiving concavity extending generally laterally to the first end of the elongated frame and with a second limb engaging mechanism being supported at the second end of the elongated frame and defining a limb receiving concavity extending generally laterally to the second end of the elongated frame.

It is preferred that the apparatus include an adjusting mechanism for selectively varying the longitudinal extent of the elongated frame. In one embodiment, the adjusting mechanism includes inner and outer telescopingly slidingly engagable, generally elongated, sub-frame portions and a retaining mechanism for selectively permitting telescopic sliding of the inner and outer sub-frame portions relative to each other. In one embodiment the retaining mechanism includes an outer sub-frame portion in the form of a tube which generally defines a tubular passageway having a diameter, and with the tube having a threaded outer surface and including a flexible, generally outwardly tapering engaging end which has a thickness greater than the thickness of the remainder of the tube. In this embodiment the inner sub-frame portion is also in the form of a tube with the inner sub-frame tube being telescopingly slidingly engaged within the tubular passageway of the tube forming outer sub-frame portion. The retaining mechanism also includes a nut which threadingly engages the threaded outer surface of the tube forming outer sub-frame portion so that, upon turning of and movement of the nut toward and over the engaging end, the engaging end of the tube forming the outer sub-frame portion is tightened around and into contact with the tube forming the inner sub-frame portion so that telescopic sliding of the inner and outer tubular sub-frame portions relative to each other is thereby prevented.

In another embodiment the adjusting mechanism includes an inner sub-frame portion which is configured so as to define a plurality of inner locking passageways which pass entirely through the inner sub-frame portion and an outer sub-frame portion which is configured so as to define an outer locking passageway which passes entirely through the outer sub-frame portion and is adapted to selectively align with each of the inner locking passageways of the inner sub-frame portion when the inner and outer sub-frame portions are telescopingly slidingly engaged. The retaining mechanism, in this embodiment, includes a shaft which is adapted to be selectively and retainingly inserted into the outer and inner locking passageways when the two locking passageways are aligned so that, upon insertion of the shaft into the aligned passageways, telescopic sliding of the inner and outer sub-frame portions relative to each other is prevented. Preferably, the shaft is a bolt having a threaded end and a head with a larger width than the diameter of the outer locking passageway and includes an associated nut having a width larger than the diameter of the outer locking passageway. After insertion of the threaded end of the bolt through the two aligned locking passageways, the nut is adapted to receive and turn about the threaded end of the bolt to tightly engage the inner and outer sub-frame portions to each other so that telescooic sliding of the outer and inner sub-frame portions relative to each other is thereby prevented.

The apparatus may also include a pushing mechanism which includes an enlarged surface portion adapted for pushingly extricating an individual from a hazardous location, and the pushing mechanism may be fixed to the elongated frame or selectively engagable and disengagable to the elongated frame. Preferably, the pushing mechanism includes at least one extension bar with each extension bar being supported at an end of the elongated frame and extending outwardly from the frame beyond any torso or limb engaging mechanism which is also supported at that end of the frame. Each extension bar preferably has an extending end which supports the enlarged surface portion of the pushing mechanism. The enlarged surface portion may be formed with a variety of configurations. For example, the enlarged surface portion may be generally convex in shape, it may be generally concave in shape or it may be notched in shape.

The apparatus may also include at least one gripping handle, and each gripping handle may be selectively engagable and disengageable to the frame.

Also, the apparatus of the present invention may include an attachment mechanism adapted for retainingly engaging a flexible cord-like material such as, for example, a rope. Preferably, the attachment mechanism is a rope receiving passageway which passes through the apparatus. The rope receiving passageway is configured so that a rope can be passed entirely through the rope receiving passageway and be retainingly secured to the apparatus. Preferably, the attachment mechanism is formed within a projecting portion which is supported at an end of the elongated frame and extends outwardly from the frame beyond any torso or limb engaging mechanism which may also be supported at that end of the frame. This configuration generally limits the possibility of the rope becoming entangled in the body grappling mechanism when the rescue grapple is attached to a rope and thrown as may be desired in use.

In any of the embodiments of the present invention, any or all of the torso engaging mechanisms or limb engaging mechanisms which are present may be selectively detached from the elongated frame. In one such embodiment any or all of the torso engaging mechanisms and/or limb engaging mechanisms which are present may be adapted to telescopingly engage the elongated frame. In this embodiment the apparatus may further include a locking mechanism adapted to fixedly retain the torso and/or limb engaging mechanisms to the elongated frame in the telescopingly engaged configuration. That is, individual locking mechanisms may be adapted to fixedly retain either or both the torso engaging mechanism or the limb engaging mechanism to the frame in a telescopingly engaged configuration. The locking mechanism preferably includes an arrangement for providing the elongated frame with a first locking passageway passing entirely through the frame and providing the telescopingly engaged torso or limb engaging mechanism with a second locking passageway passing entirely through the engaging mechanism with the first and second locking passageways being arranged for alignment with one another when the elongated frame and the engaging mechanism are telescopingly engaged. The locking mechanism further includes a shaft which is adapted to be retainingly inserted into the first and second locking passageways when the two passageways are aligned. For example, the locking mechanism may include an arrangement for providing the elongated frame with a first locking passageway which passes entirely through the frame and also for providing a torso engaging mechanism with a the second locking passageway which passes through the torso engaging mechanism, with the first and second locking passageways being arranged for alignment with one another when the frame and the torso engaging mechanism are telescopingly engaged, and with the shaft being adapted to be retainingly inserted into the first and second locking passageways when the two passageways are aligned to prevent disengagement of the telescopingly engaged frame and torso engaging mechanism. In another embodiment the locking mechanism may include an arrangement for providing the elongated frame with a first locking passageway which passes entirely through the frame and also for providing a limb engaging mechanism with a second locking passageway which passes through the limb engaging mechanism with the first and second locking passageways being arranged for alignment with one another when the frame and the limb engaging mechanism are telescopingly engaged. Once again, the shaft is adapted to be retainingly inserted into the first and second locking passageways when the two passageways are aligned to prevent disengagement of the telescopingly engaged frame and limb engaging mechanism. Preferably the shaft is a bolt having a threaded end and a head with a larger width than the diameter of the first locking passageway and includes an associated nut having a width larger than the diameter of the first locking passageway. After insertion of the threaded end of the bolt through the aligned first and second locking passageways, the nut is adapted to receive and turn about the threaded end of the bolt to tightly engage the frame to the telescopically engaged engaging mechanism.

Preferably the contour of the concavity of the torso engaging mechanism and the limb engaging mechanism, respectively, may be selected from the group of curved contours, straight-edged U-shaped contours, V-shaped contours, hook-shaped contours and notched contours, or various combinations thereof.

In one embodiment of the present invention, the apparatus includes a body grappling mechanism and a generally elongated frame having a first end, a substantially longitudinal extent having a textured gripping surface, and a second end. The elongated frame supports, as discussed below, the body grappling mechanism, first and second extension bars and a gripping handle mechanism which is adapted to be selectively engagable and disengagable to the frame generally at or near the first end of the frame. In this specific embodiment the body grappling mechanism includes (1) a torso engaging mechanism which extends outwardly from the longitudinal axis of the elongated frame at the first end of the frame with the torso engaging mechanism defining a torso receiving concavity having a lateral extent, with respect to the frame, with a hook-shaped contour which is selectively sized and adapted to retainingly receive the torso of an average individual and (2) two limb engaging mechanisms both of which extend outwardly from the longitudinal axis of the frame at the second end of the frame with each of the limb engaging mechanisms having a limb receiving concavity having a lateral extent, with respect to the frame, with a hook-shaped contour which is selectively sized and adapted to retainingly receive at least one of the limbs of an average individual. In this embodiment the first extension bar is supported by the frame at the first end of the frame and extends outwardly from the first end of the frame beyond the torso engaging mechanism, and includes an extending end which supports an enlarged surface portion that is adapted for pushingly extricating an individual from a hazardous location. The second extension mechanism is supported by the elongated frame at the second end of the frame and extends outwardly from the second end of the frame beyond the two limb engaging mechansisms, and also includes an extending end which supports an enlarged surface portion adapted for pushingly extricating an individual from a hazardous location. The torso engaging mechanism and the two limb engaging mechanisms are configured so that the lateral extent of each of the two limb receiving concavities is less than the lateral extent of the torso receiving concavity. Preferably, this embodiment is further provided with a projecting portion which extends outwardly from the enlarged surface of the second extension mechanism and which includes a rope receiving passageway that passes through the projecting portion and is configured so that a rope can be passed entirely through the rope receiving passageway and be retainingly secured to the apparatus. This configuration allows for a rope or another flexible device to be attached to the apparatus so that the apparatus may be thrown to or at the individual who is in peril and the apparatus may then be pulled, by the rope, to secure the individual within either the torso engaging mechanism or one of the limb engaging mechanisms.

DETAILED DESCRIPTION OF THE DRAWINGS

FIG. 1 is a top plan view of one embodiment of a safety rescue grapple constructed in accordance with the teachings of the present application.

FIG. 2 is a top plan view of another embodiment of a safety rescue grapple constructed in accordance with the teachings of the present invention.

FIG. 3 is a top plan view of a yet another embodiment of a safety rescue grapple constructed in accordance with the teachings of the present invention.

FIG. 4 is a top plan view of yet another embodiment of a safety rescue grapple constructed in accordance with the teachings of the present invention which is adapted to be telescopingly slidably extensible and wherein portions of the inner and outer sub-frame sections have been removed to more clearly illustrate one embodiment of a mechanism for selectively permitting telescopic extension.

FIG. 5 is a cross-sectional view of another embodiment of a safety rescue grapple constructed in accordance with the teachings of the present invention which is adapted to be telescopingly slidably extensible and which illustrates yet another mechanism for selectively permitting telescopic sliding of the inner and outer subframe portions relative to each other.

FIG. 6 is a top plan view, with selected portions cut away for clarity of illustration, of an embodiment of a safety rescue grapple constructed in accordance with the teachings of the present invention which has a selectively detachable grappling mechanism.

FIG. 7 is a top plan view of a safety rescue grapple constructed in accordance with the teachings of the present invention and having a hook-shaped torso engaging mechanism and a hook-shaped limb engaging mechanism, both supported at one end of the frame.

FIG. 8 is a top plan view of a safety rescue grapple constructed in accordance with the teachings of the present invention and having a hook-shaped torso engaging mechanism supported at one end of the frame and a V-shaped limb engaging mechanism supported at the other end of the frame.

FIG. 9 is a top plan view of a safety rescue grapple constructed in accordance with the teachings of the present invention and having a V-shaped torso engaging mechanism and a V-shaped limb engaging mechanism both supported at one end of the frame.

FIG. 10 is a top plan view of a safety rescue grapple constructed in accordance with the teachings of the present invention and having a V-shaped torso engaging mechanism supported at one end of the frame and a straight-edged U-shaped torso engaging mechanism and a straight-edged U-shaped limb engaging mechanism, both supported at the second end of the frame.

FIG. 11 is a top plan view of a safety rescue grapple constructed in accordance with the teachings of the present invention and having a notch-shaped torso engaging mechanism and a notch-shaped limb engaging mechanism, both supported at one end of the frame.

FIG. 12 is a top plan view of a safety rescue grapple constructed in accordance with the teachings of the present invention and having a notch-shaped torso engaging mechanism supported at one end of the frame and a hook-shaped limb engaging mechanism supported at another end of the frame.

FIG. 13 is a top plan view of a safety rescue grapple constructed in accordance with the teachings of the present invention and having a straight-edged U-shaped torso engaging mechanism and a straight-edged U-shaped limb engaging mechanism both supported at one end of the frame with a second straight-edged U-shaped torso engaging mechanism and a second straight-edged, U-shaped limb engaging mechanism both being supported at the other end of the frame.

FIG. 14 is a top plan view of a safety rescue grapple constructed in accordance with the teachings of the present invention and having a straight-edged U-shaped torso engaging mechanism supported at one end of the frame and anotch-shaped limb engaging mechanism supported at the second end of the frame.

FIG. 15 is a top plan view of one embodiment of a pushing mechanism which may be included in the safety rescue grapple of the present invention, with the pushing mechanism having a concave surface.

FIG. 16 is a top plan view of another embodiment of a pushing mechanism which may be included in the safety rescue grapple of the present invention, with the pushing mechanism having a convex surface.

FIG. 17 is a top plan view of yet a further embodiment of a pushing mechanism which may be included in the safety rescue grapple of the present invention, with the pushing mechanism having a notched surface.

DETAILED DESCRIPTION OF THE PREFERRED EMBODIMENT

Turning now to the accompanying drawings wherein like reference numerals refer to the same or equivalent structure, all of the figures illustrate embodiments of a safety rescue grapple which are adapted for use in extricating an individual from a hazardous location, or specific parts of the safety rescue grapple. The safety rescue grapple is generally designated at 20 throughout all of the figures. The safety rescue grapple 20 includes a generally elongated frame 22 having a substantially longitudinal extent and which supports a body grappling mechanism. An important feature of the present invention is that the body grappling mechanism includes at least one torso engaging mechanism 24 which extends outwardly from the longitudinal axis 26 of the frame 22 and at least one limb engaging mechanism 28 which also extends outwardly from the longitudinal axis 26 of the frame 22. The torso engaging mechanism 24 has a contour which defines a torso receiving concavity 30 having a lateral extent 32, with respect to the frame 22, which is selectively sized and adapted to retainingly receive the torso of an average individual. The torso receiving concavity 30 is located to extend generally laterally with respect to a first end 34 of the frame 22. The limb engaging mechanism 28 has a contour which defines a limb receiving concavity 36 having a lateral extent 38, with respect to the frame 22, which is selectively sized and adapted to retainingly receive at least one of the limbs of an average individual. In this regard, another important aspect of the present invention is that the lateral extent 38 of the limb receiving concavity 36 is less than the lateral extent 32 of the torso receiving concavity 30. These two differently sized lateral extents 32,38 provide a person who is attempting to rescue an individual from a hazardous location with two differently sized concavities 30,36, and thus increases the possibility of the rescuing individual being able to quickly grapple a convenient or accessible part of the body of the person who is in jeopardy. The purpose of the two different sized concavities 30,36 is to greatly improve the possibility that a portion (torso or limb) of the individual in peril can be grappled by the present apparatus. For example, if the torso of the individual who is to be rescued is too large to be grappled by the torso receiving concavity 30 it is still quite likely that the individual can be grappled elsewhere by either the limb receiving concavity 36 or the torso receiving concavity 30.

Depending upon the hazardous agent to which the individual who is in peril is being subjected, it is preferable for the entirety of the safety rescue grapple 20 to be formed entirely from, in the case of chemical agents and hazards, a chemically resistant material or, in the case of an electrical field or current hazard, an electrically insulating material. As used herein the term "electrically insulating material" refers to any material which shows infinite resistance on a Biddle Meggar to a value of at least about 5,000 volts at a mega ohms X 5 scale. As used herein the term "chemically resistant material" refers to any material which is substantially chemically inert with respect to the hazardous agent. Forming the safety rescue grapple 20 from a material which is either chemically resistant or electrically insulating or both chemically resistant and electrically insulating increases the utility of the safety rescue grapple 20 in a wide variety of situations. Furthermore, use of such materials will result, for example in the case of an electrical current hazard, in the rescuing individual being protected from the potentially hazardous effect of contacting an individual who is being subjected to an electrical current. If the safety rescue grapple 20 is designed to be used in an electrically hazardous situation it is not absolutely necessary for the entirety of the safety rescue grapple 20 to be formed from an electrically insulating material in that it is only necessary for selected portions of the grapple 20 to be formed from an electrically insulating material so that essentially total and effective electrical insulation of the rescuing individual from the hazardous electrical field will be effected upon grappling of the individual. Accordingly, it is generally preferred that the body grappling mechanism and the frame 22 be formed entirely from an electrically insulating material so as to prevent conduction of the electrical current from the imperiled individual to the rescuing individual upon utilization of the safety grappling device 20. The situation with regard to a chemical hazard is somewhat different in tht it is usually desired for those portions of the safety rescue grapple 20 which are likely to come in contact with the caustic, poisonous, or other hazardous chemical agent to be chemically resistant to the chemical agent. Accordingly, it is desirable for the body grapping means and the frame 22 to be formed entirely from a chemically resistant material. An exemplary, non-limiting, electrically insulating material is Underwriters Laboratories approved polyvinyl chloride (PVC) tubing.

The safety rescue grapple may be configured in a wide variety of shapes and sizes. For example, as illustrated in FIG. 1, the apparatus could comprise at least one torso engaging mechanism 24 which is supported at the first end 34 of the elongated frame 22 and defines a torso receiving concavity 30 extending generally laterally to the first end 34 of the frame 22, and also at least one limb engaging mechanism 28 which is supported at a second end 40 of the elongated frame 22 and defines a limb receiving concavity 36 extending generally laterally to the second end 40.

Alternatively, as illustrated in FIG. 2, the apparatus 20 could comprise at least one torso engaging mechanism 24 which is supported at the first end 34 of the elongated frame 22 and defines a torso receiving concavity 30 extending generally laterally to the first end 34 of the frame 22, and at least one limb engaging mechanism 28 which is also supported at the first end 34 of the elongated frame 22 and defines a limb receiving concavity 36 extending generally laterally to the first end 34 of the frame 22. FIG. 2 also illustrates the presence of gripping handles 42 which serve to improve the grasp an individual may obtain on apparatus 20. If desired, the embodiment illustrated in FIG. 2 could further include a second limb engaging mechanism 28 which is supported at the second end 40 of the elongated frame means 22 and which defines a limb receiving concavity 36 extending generally laterally to the second end 40. Alternatively, the embodiment illustrated in FIG. 2 could comprise a second torso engaging mechanism 24 which is supported at the second end 40 of the elongated frame 22 and which defines a torso receiving concavity 30 extending generally laterally to the second end 40 of the frame 22. In certain situations it may be desirable to provide the embodiment illustrated in FIG. 2 with both a second limb engaging mechanism 28 and a second torso engaging mechanism 24 both of which are supported at the second end 40 of the elongated frame 22. In this embodiment the second limb engaging mechanism 28 would define a second limb receiving concavity 36 extending generally laterally to the second end 40 of the frame 22 and the second torso engaging mechanism 24 would define a second torso receiving concavity 30 extending generally laterally to the second end 40 of the elongated frame 22. Numerous other combinations of multiple torso engaging mechanisms and/or multiple limb engaging mechanisms located at the first end 34 of the elongated frame 22 or both the first end 34 of the elongated frame 22 and the second end 40 of the elongated frame 22 should be readily apparent to those of skill in the art in view of the present disclosure.

A preferred embodiment of the present invention is illustrated in FIG. 3. The apparatus 20 illustrated in FIG. 3 includes an elongated frame 22 having a single torso engaging mechanism 24 supported at the first end 34 of the elongated frame 22. The torso engaging mechanism 24 defines a torso receiving concavity 30 having a lateral extent 32 with respect to the longitudinal axis 26 of the elongated frame 22. The apparatus illustrated in FIG. 3 also includes two limb engaging mechanisms 28, both of which are supported at the second end 40 of the elongated frame 22. Each of the limb engaging mechanisms 28 define a limb receiving concavity 36 having a lateral extent 38 with respect to the longitudinal axis 26 of the elongated frame 22. This embodiment also includes an elongated frame 22 which has an outer surface which is textured 44 to assist an individual in firmly gripping the apparatus 20. Texturing 44 of the outer surface may be accomplished by any conventionally known manner. This embodiment also includes two pushing mechanisms, both of which are generally represented at 46. Each pushing mechanism 46 includes an enlarged surface portion 48 formed at the extending end 50 of an extension bar 52 so as to extend outwardly from the frame 22 beyond the body grapping means for pushingly extricating an individual from a hazardous location. This may be desirable when it is impossible or extremely difficult to utilize the apparatus 20 to grapple an endangered individual. Of course, pushing mechanisms 46 of this type may be incorporated into any other embodiment of the present invention, as desired.

If desired, the apparatus 20 of the present invention may further include a projecting attachment portion 54, shown in FIG. 3, which is adapted to retainingly engage a rope or other rope-like material. This projecting attachment portion 54 defines a rope receiving passageway 56 which passes therethrough and is configured so that a rope (not shown) can be passed entirely through the rope receiving passageway 56 and be retainingly secured to the apparatus 20. Preferably, the projecting portion 54 is supported at and extends outwardly from an end of the frame 22 beyond any torso or limb engaging mechanism which is also supported at that end. The projecting attachment portion 54 may be selectively engagable with the apparatus by having a threaded end portion (not shown) that can be screwed into the apparatus at any selected portion thereof, such as, for example one of the enlarged surface portions 48 as shown in FIG. 3. FIG. 3 also illustrates a gripping handle 58 which is different than the gripping handle 42 disclosed in FIG. 2, and which is adapted to be selectively engaged or disengaged from the apparatus 20 at a point near or at an end, for example the first end 34, of the frame 22. The selective engagement and disengagement of gripping handle 58 is accomplished, for example by providing the apparatus 20 with a threaded hole 60 which is adapted to threadingly receive a threaded extending portion 62 of gripping handle 58. Accordingly, a firm and fixed retention of the gripping handle 58 to apparatus 20 may be accomplished by inserting the threaded end 62 of the handle 58 into the threaded hole 62 and appropriately rotating the handle 58.

FIGS. 4 and 5 illustrate further features which may be included in the safety rescue grapple 20. In particular, the apparatus 20 may include an adjusting mechanism which is adapted for selectively varying the longitudinal extent of the frame 22, and which comprises inner 64 and outer 66 sub-frame portions that as illustrated in FIG. 4 may support, respectively, the body grappling means and each end of the apparatus and they are telescopically slidingly engaged to each other, and a retaining mechanism which can selectively prevent the telescopic sliding of the inner 64 and the outer 66 sub-frame portions relative to each other. A dust wiping mechanism may be provided between the inner 64 and outer 66 sub-frame portions at the telescopic juncture thereof to prevent dust from collecting between the portions and thereby reducing the efficiency of telescopic sliding of the portions. In FIG. 4, the sub-frame portions 64 and 66 include a plurality of inner locking passageways 68 and an outer locking passageway 70, respectively, passing therethrough so that they can be aligned at various extended or contracted positions of the sub-frame portions 64 and 66 and receive a retaining mechanism in the form of a bolt or shaft 72 having a head 74 that is greater in width than the diameter of outer passageway 70 and having a threaded end 76 for receiving a nut 78. Thus, the sub-frame portions 64 and 66 can be selectively moved longitudinally with respect to each other as shown by arrow 80 until the desired length of the frame 22 is reached, whereupon the bolt 72 is inserted in the aligned passageways 68,70 and nut 78 is attached to the bolt 72 to hold the sub-frames, 64,66 securely in place. In FIG. 5, an alternate retaining mechanism 81 is illustrated and includes the other sub-frame portion 66 being in the form of a tube generally defining a tubular passageway 84 having a diameter 86, and being formed with a threaded outer surface 88 and a flexible outwardly tapering engaging end 90 having a clamping portion 92 which has a thickness that is greater than the thickness of the remainder of the outer sub-frame portion 66. The inner sub-frame portion 64 is in the form of a tube which is telescopically slidingly engaged within the tubular passageway 84 of the outer sub-frame portion 66, and a nut 94 threadingly engages the threaded outer surface 88 of the outer sub-frame portion 66 so that, upon turning of and movement of the nut 94 toward and over the clamping portion 92 of the engaging end 90 in the direction of the arrow 96 in FIG. 5, the engaging end 90 of the outer sub-frame portion 66 is tightened around and into contact with the inner sub-frame portion 64 and telescopic sliding of the inner 64 and outer 66 sub-frame portions relative to each other is thereby prevented.

Either or both of all of the torso engaging and limb engaging mechanisms 24 and 28 may be selectively detachable from the elongated frame 22. One such arrangement is illustrated in FIG. 6 which shows a configuration where both the torso engaging mechanism 24 and the limb engaging mechanism 28 are selectively detachable from the frame 22, and with both of the mechanisms 24,28 being adapted to telescopically slidingly engage the frame 22 by a conventional male/-female coupling at, for example, the end 40 of frame 22. In this arrangement, the apparatus includes a locking mechanism 98 which is adapted to fixedly retain the selectively detachable engaging mechanism in the telescopically engaged configuration, a first locking passageway 100 which passes entirely through frame 22 and a second locking passageway 102 which passes entirely through a stub shaft 104 extending from the combined engaging mechanisms 24,28, the passageways 100 and 102 being arranged for alignment with one another when the frame 22 and the stub shaft 104 are telescopically engaged. The locking mechanism 98 also includes a shaft 106 which, in the illustrated embodiment, is adapted to be retainingly inserted into the aligned first and second locking passageways 100 and 102, the shaft 106 having a head 108 which has a width larger than the diameter of the first locking passageway 100 and an opposite threaded end 110 which is adapted to retainingly receive a nut 112 having a width which is greater than the diameter of the passageway 100. Upon insertion of the shaft 106 into and through the aligned passageways 100,102 and attachment of the nut 112 onto the opposed threaded end 110 of the shaft 106 the frame 22 and the selectively detachable engaging mechanism will be prevented from being detached from one another.

FIGS. 7 through 12 illustrate several of the many different geometrical configurations which may be utilized to form either the torso engaging mechanism 24 or the limb engaging mechanism 28. For example, FIG. 7 illustrates a hook-shaped torso engaging mechanism 24 and a hook-shaped limb engaging mechanism 28 which are both supported at the same end 40 of the frame 22. FIG. 8 illustrates a hook-shaped torso engaging mechanism 24 supported at end 40 of the frame 22 and a V-shaped limb engaging mechanism supported at the other end 34 of the frame 22. FIG. 9 illustrates a V-shaped torso engaging mechanism 24 and a V-shaped limb engaging mechanism 28 both supported at the same end 40 of the frame 22. FIG. 10 illustrates a V-shaped torso engaging mechanism 24 supported at one end 40 of the frame 22 with a straight-edged U-shaped torso engaging mechanism 24 and a straight-edged U-shaped limb engaging mechanism 28, both being supported at the other end 34 of the frame 22. FIG. 11 illustrates a notch-shaped torso engaging mechanism 24 and a notch-shaped limb engaging mechanism 28, both supported at one end 40 of the frame 22. FIG. 12 illustrates a hook-shaped limb engaging mechanism 28 supported at one end 34 of frame 22 and a notch-shaped torso engaging mechanism 24 supported at the other end 40 of frame 22. FIG. 13 illustrates a straight-edged U-shaped torso engaging mechanism 24 and a straight-edged U-shaped limb engaging mechanism 28, both supported at one end 40 of the frame 22 and a second straight-edged U-shaped torso engaging mechanism 24 and a second straight-edged U-shaped limb engaging mechanism 28, both supported at the other end 34 of the frame 22. FIG. 14 illustrates a straight-edged U-shaped torso engaging mechanism 24 supported at one end 40 of frame 22 and a notch-shaped limb engaging mechanism 28 supported at the other end 34 of frame 22. Of course, numerous additional combinations and types of torso engaging mechanism 24 and limb engaging mechanism 28 may be utilized.

FIGS. 15, 16 and 17 illustrate additional geometrical variations which may be used as the enlarged surface portion 48 of the pushing mechanism 46. For example, FIG. 15 illustrates the enlarged surface portion 48 provided with a concave surface. FIG. 16 illustrates the enlarged surface portion 48 provided with a convex surface, and FIG. 17 illustrates the enlarged surface portion 48 of the pushing mechanism 46 as being V-shaped. Of course, numerous additional geometrical combinations for the enlarged surface portion 48 of pushing means 46 may be utilized.

The elements of the present invention might be combined in many alternate configurations other than those disclosed in the present description and drawings, and the particular embodiment disclosed in full detail herein and illustrated in the drawings have been provided for disclosure purposes only and is not intended to limit the scope of the present invention, which is to be determined by the scope of the appended claims.

What is claimed is:

1. An apparatus adapted for use in extricating an individual from a hazardous location, said apparatus comprising:
- a body grappling means; and
- a generally elongated frame means having a first end, a substantially longitudinal extent having a textured gripping surface and a second end, said frame means supporting said body grappling means;
- first and second extension bar means; and
- gripping handle means adapted to be selectively engagable and disengagable to said frame means generally at said first end;
- said body grappling means including:
  - a torso engaging means extending outwardly from the longitudinal axis of said frame means at the first end of said frame means, said torso engaging means having a hook-shaped contour defining a torso receiving concavity having a lateral extent, with respect to said frame means, which is selectively sized and adapted to retainingly receive the torso of said individual; and
  - two limb engaging means extending outwardly from the longitudinal axis of said frame means at the second end of said frame means, each of said limb engaging means having a hook-shaped contour defining a limb receiving concavity having a lateral extent, with respect to said frame means, which is selectively sized and adapted to retainingly receive at least one of the limbs of said individual; and
- with said first extension means being supported by said frame means at said first end and extending outwardly from said first end beyond the torso engaging means, said first extension means having an extending end which supports an enlarged surface portion adapted for pushingly extricating the individual from said hazardous location; and
- with said second extension means being supported by said frame means at said second end and extending outwardly from said second end beyond the two limb engaging means, said second extension means hving an extending end which supports an enlarged surface portion adapted for pushingly extricating the individual from said hazardous location; and
- with the lateral extent of each of said limb receiving concavities being less than the lateral extent of said torso receiving concavity.

2. The apparatus according to claim 1, wherein the apparatus further comprises a projecting portion which extends outwardly from the enlarged surface portion by said second extension means, said projecting portion including a rope receiving passageway passing through said projecting portion, said rope receiving passageway being configured so that a rope can be passed entirely through the rope receiving passageway and be retainingly secured to the apparatus.

3. An apparatus adapted for use in extricating an individual from a hazardous location, said apparatus comprising:
- a body grappling means; and
- a generally elongated frame means having a substantially longitudinal extent and supporting said body grappling means;
- said body grappling means including:
  - a torso engaging means extending outwardly from a longitudinal axis of said frame means and having a contour defining at least one torso receiving concavity having a lateral extent, with respect to said frame means, which is selectively sized and adapted to retainingly receive the torso of said individual; and
  - a limb engaging means extending outwardly from the longitudinal axis of said frame means and having a contour defining at least one limb receiving concavity having a lateral extent, with respect to said frame means, which is selectively sized and adapted to retainingly receive at least one of the limbs of said individual; and
- with the lateral extent of said limb receiving concavity being less than the lateral extent of said torso receiving concavity.

4. The apparatus according to claim 3, wherein the body grappling means and the frame means are formed entirely from a chemically resistant material.

5. The apparatus according to claim 3, wherein the body grappling means and the frame means are formed entirely from an electrically insulating material.

6. The apparatus according to claim 3, which comprises at least one torso engaging means which is supported at a first end of the elongated frame means and defines a torso receiving concavity extending generally laterally to said first end, and at least one limb engaging means which is supported at a second end of the elongated frame means and defines a limb receiving concavity extending generally laterally to said second end.

7. The apparatus according to claim 3, which comprises at least one torso engaging means which is supported at a first end of the elongated frame means and defines a torso receiving concavity extending generally laterally to said first end, and at least one limb engaging means which is also supported at the first end of the elongated frame means and defines a limb receiving concavity extending generally laterally to said first end.

8. The apparatus according to claim 7, further comprising a second limb engaging mans which is supported at a second end of the elongated frame means and defines a limb receiving concavity extending generally laterally to said second end.

9. The apparatus according to claim 7, further comprising a second torso engaging means which is supported at a second end of the elongated frame means and defines a torso receiving concavity extending generally laterally to said second end.

10. The apparatus accordingly to claim 9, further comprising a second limb engaging means which is also supported at the second end of the elongated frame means and defines a limb receiving concavity extending generally laterally to said second end.

11. The apparatus according to claim 3, further comprising adjusting means for selectively varying the longitudinal extent of the frame means.

12. The apparatus according to claim 11, wherein the adjusting means comprises inner and outer telescopingly slidingly engagable, generally elongated, sub-frame portions and a retaining means for selectively preventing telescopic sliding of the inner and outer sub-frame portions relative to each other.

13. The apparatus according to claim 12, wherein the retaining means comprises:

the outer sub-frame portion being in the form of a tube generally defining a tubular passageway having a diameter, said tube having a threaded outer surface and including a flexible, outwardly tapering engaging end having a thickness greater than the thickness of the remainder of the outer sub-frame portion;

the inner sub-frame portion being in the form of a tube telescopingly slidingly engaged within the tubular passageway of the outer sub-frame portion;

and a nut threadingly engaging the threaded outer surface of said outer sub-frame portion so that, upon turning of and movement of said nut toward and over said engaging end, the engaging end of the outer sub-frame portion is tightened around into contact with the inner sub-frame portion and telescopic sliding of the inner and outer sub-frame portions relative to each other is prevented.

14. The apparatus according to claim 12, wherein the retaining means comprises:

the inner sub-frame portion defining a plurality of inner locking passageways passing entirely through the inner sub-frame portion;

the outer sub-frame portion defining an outer locking passageway passing entirely through the outer sub-frame portion and being adapted to selectively align with each of the locking passageways of said inner sub-frame portion when the sub-frame portions are telescopingly slidingly engaged; and a shaft means adapted to be selectively retainingly inserted into the outer and inner locking passageways when the two locking passageways are aligned so that telescopic sliding of the outer and inner sub-frame portions relative to each other is prevented.

15. The apparatus according to claim 3, further comprising pushing means including an enlarged surface portion adapted for pushingly extricating the individual from said hazardous location.

16. The apparatus according to claim 15, wherein said pushing means is selectively engagable and disengagable to said frame means.

17. The apparatus according to claim 15, wherein said pushing means includes an extension means supported by said frame means and which extends outwardly from said frame means beyond the body grappling means, said extension means having an extending end which supports said enlarged surface portion.

18. The apparatus according to claim 3, further comprising at least one gripping handle.

19. The apparatus according to claim 3, wherein the apparatus further includes attachment means adapted for retainingly engaging a rope.

20. The apparatus according to claim 19, wherein the attachment means is a rope receiving passageway passing through said apparatus, said passageway being configured so that a rope can be passed entirely through the rope receiving passageway and be retainingly secured to the apparatus.

21. The apparatus according to claim 19, wherein the attachment means is formd within a projecting portion which extends outwardly from said frame means beyond said body grappling means.

22. The apparatus according to claim 3, wherein the torso engaging means is selectively detachable from said frame means.

23. The apparatus according to claim 22, wherein said torso engaging means is adapted to telescopingly engage said frame means.

24. The apparatus according to claim 23, further comprising a locking means adapted to fixedly retain the torso engaging means to said frame means in a telescopingly engaged configuration.

25. The apparatus according to claim 24, wherein the locking means comprises:

the frame means defining a first locking passageway passing entirely through the frame means;

the torso engaging means defining a second locking passageway passing therethrough, with said first and second locking passageways being arranged for alignment with one another when the frame means and the torso engaging means are telescopingly engaged; and a shaft means adapted to be retainingly inserted into the first and second locking passageways when the two passageways are aligned.

26. The apparatus according to claim 3, wherein the limb engaging means is selectively detachable from said frame means.

27. The apparatus according to claim 26, wherein said limb engaging means is adapted to telescopingly engage said frame means.

28. The apparatus according to claim 27, further comprising a locking means adapted to fixedly retain the limb engaging means to said frame means in a telescopingly engaged configuration.

29. The apparatus according to claim 28, wherein the locking means comprises:

the frame means defining a first locking passageway passing entirely through the frame means;

the limb engaging means defining a second locking passageway passing therethrough, with said first and second locking passageways being arranged for alignment with one another when the frame means and the limb engaging means are telescopingly engaged; and a shaft means adapted to be retainingly inserted into the first and second locking passageways when the two passageways are aligned.

30. The apparatus according to claim 3, wherein the contour of the concavity of the torso engaging means is selected from the group consisting of curved contours, straight-edged U-shaped contours, V-shaped contours, hook-shaped contours and notched contours.

31. The apparatus according to claim 3, wherein the contour of the concavity of the limb engaging means is selected from the group consisting of curved contours, straight-edged U-shaped contours, V-shaped contours, hook-shaped contours and notched contours.

* * * * *

UNITED STATES PATENT OFFICE
CERTIFICATE OF CORRECTION

Patent No. 4,580,825 Dated April 8, 1986

Inventor(s) Douglas W. Johnson

It is certified that error appears in the above-identified patent and that said Letters Patent are hereby corrected as shown below:

Column 1, Line 49, delete "might" and insert therefor — may —.
Column 4, Line 14, delete "telescooic" and insert therefor — telescopic —.
Column 7, Line 57, delete "anotch-shaped" and insert therefor — a notch-shaped —.
Column 9, Line 23, delete "tht" and insert therefor — that —.
Column 9, Line 28, delete "grapping" and insert therefor — grappling —.
Column 10, Line 40, delete "grapping" and insert therefor — grappling —.
Column 11, Line 42, delete "other" and insert therefor — outer —.
Column 14, Line 58, delete "mans" and insert therefor — means —.

Signed and Sealed this

*Sixteenth* Day of *September 1986*

[SEAL]

*Attest:*

DONALD J. QUIGG

*Attesting Officer* *Commissioner of Patents and Trademarks*